United States Patent [19]

Michaud-Soret

[11] Patent Number: 4,744,849
[45] Date of Patent: May 17, 1988

[54] METHOD FOR MANUFACTURING A MOLD FOR PRODUCING MOLDED PARTS OF LARGE SIZE AND OF A COMPOSITE MATERIAL

[75] Inventor: Jean A. Michaud-Soret, Paris, France

[73] Assignee: Societe Nationale Industrielle Aerospatiale, France

[21] Appl. No.: 848,486

[22] Filed: Apr. 7, 1986

Related U.S. Application Data

[62] Division of Ser. No. 651,609, Sep. 17, 1984, Pat. No. 4,659,056.

[30] Foreign Application Priority Data

Sep. 19, 1983 [FR] France ................. 83 14838

[51] Int. Cl.$^4$ .................................................. B29C 39/26
[52] U.S. Cl. ..................................... 156/245; 156/153; 156/297; 249/78; 249/79; 249/111; 264/219
[58] Field of Search ................... 156/153, 245, 297; 249/78, 79, 80, 111; 264/219, 272.14

[56] References Cited

U.S. PATENT DOCUMENTS

| | | | |
|---|---|---|---|
| 3,173,175 | 3/1965 | Lemelson | 249/79 X |
| 3,185,432 | 5/1965 | Hager | 249/78 |
| 3,420,981 | 1/1969 | Martinet | 249/78 X |
| 3,932,096 | 1/1976 | Kartman | 249/79 X |
| 4,390,485 | 6/1983 | Yang | 249/78 X |

FOREIGN PATENT DOCUMENTS 2514695 12/1985 France .

Primary Examiner—Robert A. Dawson
Attorney, Agent, or Firm—McGlew and Tuttle

[57] ABSTRACT

A molding cavity wall (10) is made in a plurality of parts of a cheap material having a high thermal conductivity, for example a thin metal sheet (10), at least one heating device (11) is applied on the wall in direct thermal exchange relation to the external surface of the wall (10), and a thermal insulator constituted by a foam (12) of highly rigid resin is applied to the wall (10) in uniform pressure transmitting relation to said wall.

12 Claims, 2 Drawing Sheets

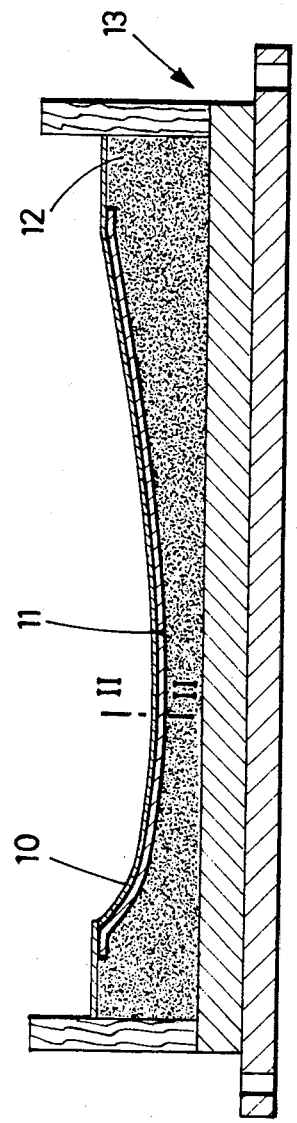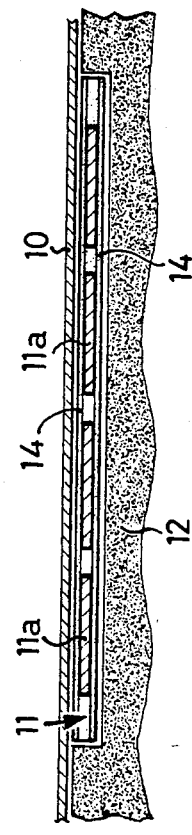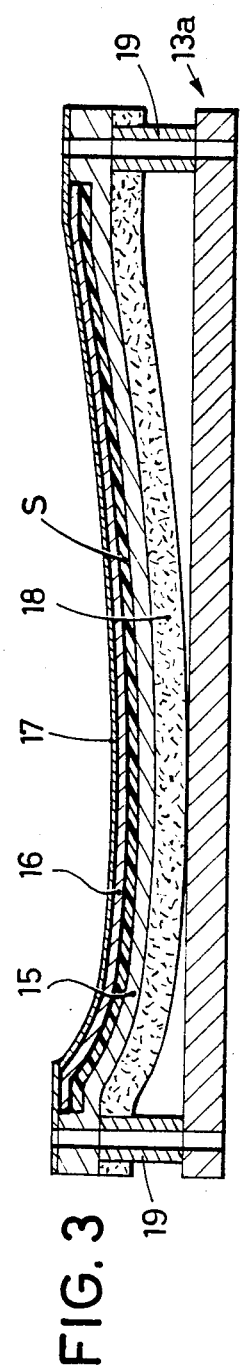

METHOD FOR MANUFACTURING A MOLD FOR PRODUCING MOLDED PARTS OF LARGE SIZE AND OF A COMPOSITE MATERIAL

This is a division of application Ser. No. 651,609 filed Sept. 17, 1984 and now U.S. Pat. No. 4,659,056

The present invention generally relates to the manufacture of molded parts of large size and it more particularly relates to a method for manufacturing a cheap mold for articles of large size and of a composite material which is polymerizable under heat and pressure.

Composite materials based on resins and fibers have undergone considerable development in many applications owing to their intrinsic qualities: strength, stability, insensitivity to corrosion and other well-known properties among which in particular are the ease of manufacture by molding and polymerization by application of heat and pressure.

However, the manufacture of articles of large size from resins reinforced with fibers has only been possible up to the present time with manual methods in which one or more operators deposit layers, for example of glass fabric, by impregnating them as work proceeds with layers of resin, on a form or die, the polymerization being achieved solely by the addition of a catalyst to the resin, owing to the fact that the uniform application of pressure and heat is extremely difficult on parts of large size. This method is time-consuming and has moreover the drawbacks of polymerization by exothermic reaction.

In order to produce parts of reinforced resin polymerized by application of heat and pressure, there must be used rigid molds having passageways for the circulation of a heating agent.

Such molds are extremely expensive to produce and mainly the cost involved in this manufacture has up to the present time rendered the manufacture of articles of large size, for example beams of composite material polymerized by application of heat and pressure, impossible, although the qualities of these materials are of particular interest in this application and in many other applications.

An object of the invention is to overcome this drawback and to provide a method for manufacturing a mold for producing articles of large size of reinforced resin by molding under heat and pressure.

The invention therefore provides a method for manufacturing a mold for producing molded parts of large size and of composite material polymerized by application of heat and pressure, said method comprising forming a wall of a molding cavity in a plurality of parts of a cheap material having a high thermal conductivity, applying heating means in direct thermal exchange relation to the external surface of said wall of the cavity, applying a thermal insulator on top of said heating means and fixing the various parts of the wall on rigid mold-supports in uniform pressure transmission relation to said wall.

It will be understood that as the thermal insulator constitutes a barrier, the heat generated by the heating means is entirely applied to the composite material located in the mold cavity through the conductible wall of the mold, this heat acting jointly with the pressure applied to the mold-supports and permitting the obtainment of the desired polymerization of the material.

According to another feature of the invention, the heating means applied to the exterior of said cavity wall are interchangeable flexible elements.

According to one embodiment, the cavity wall is made from a thin sheet carried by a rigid and uncompressible mold-support of an insulating material, said heating elements being interposed between said material and said wall in a detachable manner.

According to another embodiment of the invention, said cavity wall is formed by a rigid thick sheet of metal which itself ensures the transmission of the molding pressure.

The invention also provides a mold for molding parts of large size of resin reinforced with fibers and polymerized by application of heat and pressure, produced by the aforementioned method.

The invention further provides a structure of large size of resin reinforced with fibers and polymerized by application of heat and pressure, said structure being produced by means of the mold defined hereinbefore and comprising, as the case may be, heating elements incorporated within the mass in the known manner.

The following description, with reference to the accompanying drawings which are given merely by way of examples, will explain how the present invention may be carried out.

FIG. 1 is a sectional view of one half of a mold section according to a first embodiment of the invention.

FIG. 2 is a sectional view, to an enlarged scale, taken on line II—II of FIG. 1.

FIGS. 3 and 4 are views similar to FIG. 1 of two other embodiments of the invention.

Figure 4:
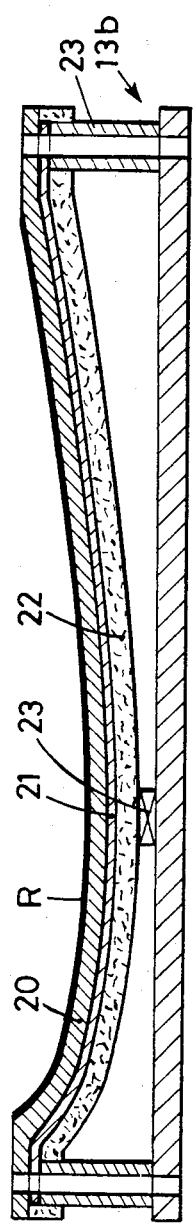

Molds employed for molding parts generally comprise two semi-shells which are generally identical. Only the shell or lower half of a mold element according to the invention has been described and shown in the various figures of the drawing.

The mold half shown in FIG. 1 comprises a mold cavity wall 10 which is formed in this embodiment by a thin metal sheet which has been shaped by any suitable method, for example by a conventional sheet metal working method.

The metal sheet 10 has on its outer surface opposed to the molding cavity heating means formed by elements 11 of a known type which are spaced along the length of the mold element and these elements are held in position by a mass 12 of a hard thermally insulating synthetic foam material capable of transmitting a uniform pressure throughout the entire surface of the assemblage formed by the mold cavity wall 10 and the heating elements 11.

The foam block 12 is preferably disposed in a frame generally designated by the reference 13 and connected to the ground and therefore undeformable as concerns straightness and twist.

It will be understood that the heating elements 11 are consequently in direct thermal exchange relation to the thin sheet metal 10 constituting the wall of the molding cavity and that the mass of foam 12 constitues a thermal barrier so that the heat produced by the heating elements 11 is entirely directed toward the interior of the molding cavity through the thin sheet 10 whose thermal conductivity is high. This mass of foam permits a limitation of the power required for the polymerization which is therefore effected on the spot with no need to employ a heating furnace or an oven.

FIG. 2 shows to an enlarged scale the arrangement of a heating element 11 between the mass of foam 12 and the cavity wall 10.

Each heating element 11 comprises in the known manner an electric resistance element formed for example by a thin strip of metal 11a disposed in a continuous sinuous path between two sheets 14 of a fibrous material, for example glass fabric, which are adhered by means of a polymerized synthetic resin.

The principle of these heating elements is known. They may be manufactured rapidly and cheaply to any size and with known values of resistance, in particular by means of sheets of a suitable synthetic material on which are disposed adhesive strips or bands containing lead.

These elements, or resistances, have the advantage of a very large thermal exchange area. They are supplied with a suitable electric power and their temperature is controlled.

The thermally insulating foam 12 may be directly poured onto the heating elements and onto the rear surface of the molding cavity wall 10 and subsequently cut to shape so as to enter the support 13.

It may also be made in the form of a block and worked upon so as to assume a shape corresponding to that of the mold cavity wall 10.

The heating elements are so spaced apart as to distribute the heat along the length of the mold cavity wall in a roughly uniform manner.

According to the embodiment shown in FIG. 3, the mold according to the invention is produced by means of a form or mold-support 15 of rigid and thick sheet metal which was previously machined or shaped so as to have the desired shape. Disposed on the inner wall of this thick sheet is a layer S of a glass fiber/resin laminate which receives in a detachable manner the heating elements 16 on which a mold or form of thin sheet metal 17 is placed. This arrangement enables the heating elements to be repaired or replaced. A thermally insulating foam 18 of low-density plastics material which constitutes the thermal barrier is applied on the outer surface of the mold-support 15 of thick sheet metal.

In this embodiment, the mold-support 15 of thick sheet metal has a certain thermal inertia which is taken advantage of for achieving an improved distribution of the heat given off by the heating elements 16. Also, in this embodiment, the mold part is mounted on a frame 13a, for example by means of spacer elements 19.

In the embodiment shown in FIG. 4, the mold cavity wall is formed directly by a thick approximately-machined sheet metal 20, the suitable profile being imparted thereto by a layer R of resin with a metal powder filler, for example aluminum.

Applied on the external surface of the sheet metal 20 are the heating elements 21 on which is applied a layer 22 of a thermally insulating and low-density foam which acts as a thermal barrier. In this embodiment, the mold cavity wall of thick sheet metal 20 also constitutes the mold-support. It is fixed to the frame 13b by means of spacer elements 23.

Figure 5:
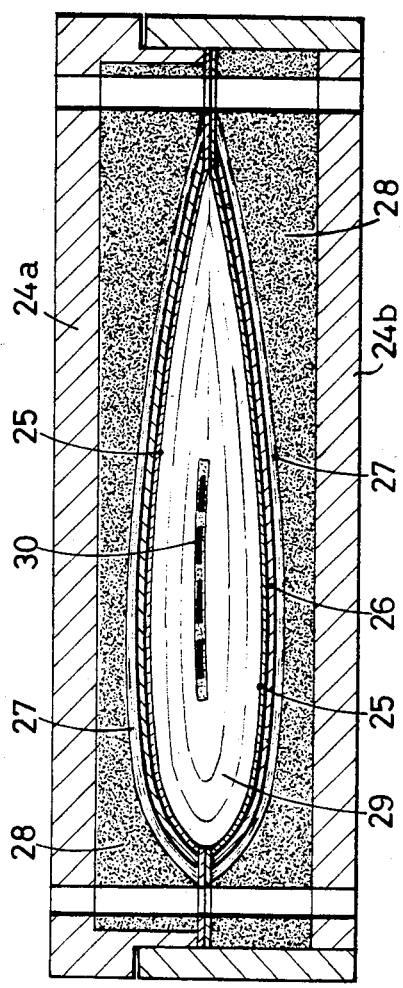
FIG. 5 is a cross-sectional view of a mold according to the invention in which a blade of a wind-engine is molded.

Shown in FIG. 5 is a complete mold comprising an upper half 24a and a lower half 24b in which the mold cavity wall is formed by a thin sheet metal 25 on the external surface of which are disposed heating elements 26, the mold-support being formed by a stack or super-position 27 of layers of glass fabric previously impregnated with resin and disposed in a rigid high-density insulating foam block 28 which was previously machined to the desired shape. The part molded in this mold is advantageously produced by means of a plurality of layers of the pre-impregnated semi-product, for example, that disclosed in the French Pat. No. 2,514,695 of the applicant which are generally designated by the reference 29 and in the middle of which are disposed heating elements 30 which are preferably disposed in the non-polymerized state between the layers 29, these heating elements 30 being simultaneously supplied with power with the heating elements 26 and with the application of pressure. These heating elements 30 are finally incorporated within the material of the molded part with which they become completely integral.

Figure 6:
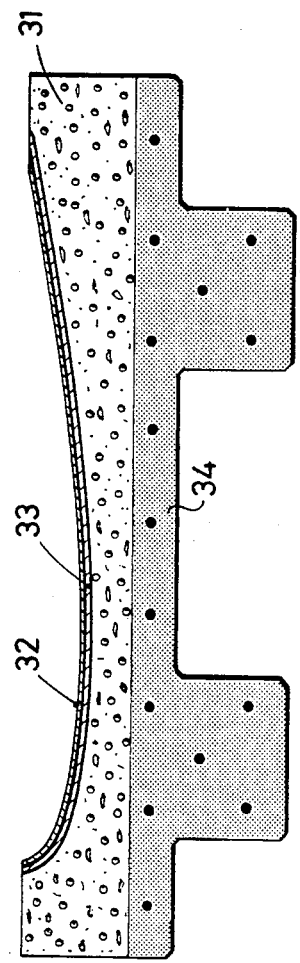
FIG. 6 is a sectional view of a modification of a mold part according to the invention.

FIG. 6 shows another embodiment of a mold according to the invention in which the mold-support is constituted by a mass 31 of lightened concrete having a filler of cellular glass balls and microspheres of glass having a density of between 0.3 and 0.7 so as to impart to this concrete high thermally insulating properties while allowing this concrete to have the rigidity required for uniformly transmitting the pressure over the thin sheet metal 32 constituting the mold cavity wall. The mass of lightened concrete 31 may be easily made to the required shape so as to constitute the mold-support and ,after its setting,it is capable of uniformly transmitting the pressure to the thin sheet metal 32 while forming a suitable thermal barrier with respect to the heat given off by the heating elements 33. The mass 31 of cellular concrete is advantageously supported by a support 34 of reinforced concrete. Such a mold ensures a very high reliability in the manufacture of structural parts of large size since such a lightened concrete has no interstice or air bubble.

In all the embodiments described hereinbefore there is of course employed in the known manner a suitable mold-stripping agent so as to avoid any adherence of the composite material to the mold cavity wall.

It will be understood that the invention permits the cheap production of molds for producing parts of composite material of large size and in a plurality of elements which may be easily adapted to be assembled one after the other and on which it is possible to apply pressure-transmitting means, while the heating elements transmit their heat directly through the conductive wall of the mold cavity and that, optionally, heating elements incorporated within the material of the molded part ensure a uniform heating of the composite material so as to polymerize the latter.

It will be observed that the molds produced in accordance with the invention jointly with the semi-product such as that described in the French Pat. No. 2,514,695 of the applicant, which is non-polymerized or partly polymerized,permit the heretofore impossible production of parts of large and even very large size, the aforementioned semi-product resulting in an extremely large saving in time in the course of the disposition of the various layers of the composite product in the molding cavities.

I claim:

1. A process for producing a mold to make molded pieces with large dimensions, in particular pieces having a large length, and made of composite material, comprising forming a thick, rigid sheet metal mold cavity wall having an inner mold surface with an impression shape for pieces to be molded, and an exterior mold surface, the wall having high thermal conductivity, applying a plurality of electrical resistance heating elements on one of said inner and exterior mold surfaces of said wall and in direct contact with said wall, covering said wall plus heating elements with a layer which is at least partly made of metal that gives the layer thermal conductivity, covering said wall plus heating elements, at said exterior mold surface of said wall, with a layer of non-rigid synthetic resin foam having low density and being thermally insulating, and mounting said wall with its heating elements and layers to a mold frame.

2. A process according to claim 1, wherein said heating elements are applied to said inner molding surface and comprise ribbons of adhesive lead which are attached on a support sheet made of fibers impregnated with a flexible polymerized synthetic resin.

3. A process according to claim 1, including covering said inner molding surface of said wall with a layer of resin reinforced with fibers, said layer which is at least partly made of metal heating elements and comprising a thin sheet metal layer having said impression shape for molding pieces, said layer of synthetic foam being applied to said exterior surface of said thick, rigid sheet metal mold cavity wall.

4. A process according to claim 3, wherein said heating elements comprise ribbons of adhesive lead attached on a support sheet made of flexible fibrous impregnated polymerized synthetic resin.

5. A process for producing a mold intended for forming molded parts with large dimensions, especially parts of great length, made of a composite material and particularly of reinforced resin, polymerized by the application of heat and pressure, comprising:
    making an impression molding plate of thick and rigid sheet metal with high thermal conductivity, with an internal molding surface substantially in the shape of a part to be molded and an external surface;
    applying a number of heating elements in the form of blankets including electrical resistors to the external surface of this impression molding plate and in direct thermal contact with this plate;
    covering the external surface of the impression molding plate equipped with the aforesaid heating elements, with an insulating coating of non-rigid synthetic resin foam, of low density and low thermal conductivity; and
    enclosing the molding plate with its heating elements and its insulating coating in a structure which is rigid relative to a uniform transmission of pressure to the structure.

6. A process according to claim 5, in which the aforesaid heating elements applied to the external surface of the impression molding plate are adhesive tapes of ductile metal, particularly lead, arranged to form an electrical resistor whose ends are supplied with suitable regulated voltage, with the aforesaid tapes being enclosed between two thin plastic, electrically non-conductive films.

7. A process according to claim 5, in which the internal surface of the aforesaid thick and rigid sheet metal with high thermal conductivity is shaped to the exact external shape of the parts to be molded.

8. A process pursuant to claim 5, in which the internal surface of the aforesaid thick and rigid sheet metal with high thermal conductivity, made roughly in the external shape of the parts to be molded, is formed exactly to the shape of these parts by depositing a layer of resin filled with metal powder and possibly synthetic reinforcing fibers, with this layer of resin being shaped by molding or machining to the exact profile of the parts to be molded.

9. A process for producing a mold intended for the production of molded parts of large dimensions, made of composite material and especially of reinforced resin, polymerized by the application of heat and pressure, comprising the following steps in succession:
    making an impression molding plate with thick and rigid sheet metal with high thermal conductivity, having an internal molding surface essentially in the shape of the parts to be molded and an external surface;
    shaping a recess of substantially constant thickness in the aforesaid internal surface;
    placing in this recess a thin tape having substantially the thickness of the recess and composed of heating elements forming electrical resistance and in direct thermal contact with the wall of the aforesaid recess;
    covering the external surface of the impression molding plate with an insulating layer of non-rigid synthetic resin foam of low density and low thermal conductivity; and
    enclosing this impression molding plate with its heating elements and its insulating layer in a structure which is rigid relative to the uniform transmission of pressure.

10. A process according to claim 9, in which the heating elements applied in the recess made on the internal surface of the impression molding plate are adhesive tapes of ductile metal and especially of lead, forming an electrical resistor, supplied with suitable regulated voltage, with the aforesaid tapes being placed between two thin, flexible plastic films of electrically non-conductive material.

11. A process according to claim 9, in which the thin, flexible plastic film of electrically non-conductive material are films of glass fabric pre-impregnated with thermally polymerizable synthetic resin.

12. A process according to claim 9, in which the heating elements applied in the recess made in the internal surface of the impression molding plate are placed there to be easily detachable to permit their replacement or repair.

* * * * *

UNITED STATES PATENT AND TRADEMARK OFFICE
CERTIFICATE OF CORRECTION

PATENT NO. : 4,744,849
DATED : May 17, 1988
INVENTOR(S) : Jean Alain Michaud-Soret It is certified that error appears in the above-identified patent and that said Letters Patent is hereby corrected as shown below: On the title page: Item: [73] Assignee's: should read -- Aerospatiale Societe Nationale Industrielle.--

Signed and Sealed this

Thirteenth Day of July, 1993

Attest:

MICHAEL K. KIRK

Attesting Officer

Acting Commissioner of Patents and Trademarks